United States Patent
Uno et al.

(10) Patent No.: US 8,509,320 B2
(45) Date of Patent: Aug. 13, 2013

(54) COMMUNICATION CIRCUIT AND VEHICLE COMMUNICATION APPARATUS USING THE SAME

(75) Inventors: Hideki Uno, Toyota (JP); Koji Yamada, Nagoya (JP); Yuya Makino, Anjo (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 277 days.

(21) Appl. No.: 13/151,854

(22) Filed: Jun. 2, 2011

(65) Prior Publication Data
US 2011/0299608 A1    Dec. 8, 2011

(30) Foreign Application Priority Data

Jun. 4, 2010  (JP) .................. 2010-129358

(51) Int. Cl.
*H04L 27/00*      (2006.01)
(52) U.S. Cl.
USPC ........... 375/259; 375/295; 375/316; 375/340; 375/342; 375/354; 375/296; 375/303; 375/324; 375/219; 375/220; 375/222; 375/288

(58) Field of Classification Search
USPC ............... 375/259, 295, 316, 340, 342, 354, 375/296, 303, 324, 219, 220, 222, 288
See application file for complete search history.

(56) References Cited

FOREIGN PATENT DOCUMENTS
JP    2009-278597    11/2009

*Primary Examiner* — Siu Lee
(74) *Attorney, Agent, or Firm* — Greenblum & Bernstein, P.L.C.

(57) ABSTRACT

A communication circuit is provided which transmits an information bit string from a transmission unit to a reception unit. The transmission unit includes a first modulation circuit that modulates a first carrier wave by a start bit to generate a first frequency signal, a second modulation circuit that modulates a second carrier wave by the information bit string to generate a second frequency signal, and a transmission circuit that transmits the first and second frequency signals from a transmitting antenna. The reception unit includes a reception circuit that receives a signal from the transmission unit, a first detector circuit that detects a signal of the first carrier wave to demodulate the start bit, a second detector circuit that detects a signal of the second carrier wave to demodulate the information bit string, and a detection circuit that is synchronized by the start bit and reads the information bit string.

13 Claims, 10 Drawing Sheets

COMMUNICATION CIRCUIT AND VEHICLE COMMUNICATION APPARATUS USING THE SAME

BACKGROUND OF THE INVENTION

1. Field of the Invention

The present invention relates to a communication circuit and a vehicle communication apparatus using the same, and more particularly, to a communication circuit capable of securely starting transmission of information to thus perform communication in a short time while reducing the influence by environmental noise, and a vehicle communication apparatus using the same.

2. Description of the Related Art

In a related art, in a wireless or wired communication system or remote control system, a signal has been used to control start of transmission of information. For example, a transmission side attaches a start bit to a head of an information bit string that is divided into predetermined lengths and transmits the information, and a reception side can read out the information by using the start bit. Such asynchronous communication has been widely performed. The length of the bit string of the information is not limited to a length corresponding to one character and includes an appropriate number of bits depending on purposes.

In various communications, the transmission is performed by modulating carrier waves with the signal of the bit string of the information. For short-distance transmission of relatively small information, a frequency shift keying or amplitude shift keying is used because transmission reception circuits can be implemented easily and inexpensively. In case of the amplitude shift keying of changing an amplitude of the carrier wave, the carrier wave having a single frequency is modulated in a time-division manner by the signal including the start bit and the information bit string, so that the transmission is performed.

The above communication system is also widely used for communication between in-vehicle devices that are mounted on a vehicle. For example, a communication system is known, which transmits operation information from a passenger to a reception apparatus from a console or remote controller so as to control the various in-vehicle devices by an operation switch that is provided to the console or the various in-vehicle devices by an operation switch that is provided to the console or remote controller. In this vehicle communication system, when the wireless communication is performed using radio signals, the communication is interfered by electromagnetic noises that are generated from the in-vehicle devices or vehicle surroundings. When it is difficult to securely recognize the start bit due to the noises, a transmission error is caused. A method is also performed, in which a specific signal is transmitted ahead of the start bit so as to enable the reception side to securely recognize the start bit.

As a vehicle communication system which transmits data having a frame structure, a communication system is disclosed in which a plurality of channels having different frequencies is used to transmit a data frame through a first channel and then to transmit a data frame that is extended by adding dummy bits to data through a second channel, so that the wireless communication is performed even under noise environments that interfere the reception of the radio signals of the first channel (see JP-A-2009-278597).

As described above, in the transmission by the frequency shift keying or amplitude shift keying of a single carrier wave, the start bit to give a start timing of the transmission and the information bit string are transmitted in a time division manner. Therefore, when it is difficult for the reception side to recognize the start bit to give the start timing of the transmission due to the exogenous noises and the like, the reception error is caused. In addition, when the start bit and the bit string of information are indistinguishable, the reception error is caused. As the measures, a method has been suggested in which an extra signal is added or a start bit is made to be redundant. However, a problem is caused in that the communication time is prolonged. In addition, when the reception error is caused, the retransmission is required to recover the error, so that the communication is further prolonged.

In particular, in the vehicle communication system under noise environments, a communication method is demanded which enables the communication in a shortest time by using a simple transmission and reception circuit. Recently, a system that transmits the information so as to control the various in-vehicle devices has been rapidly increased. The related-art communication methods that use radio signals, infrared and wires have a problem in that the configuration or control of the communication In addition, the operation and input devices for controlling the in-vehicle devices have been also larger and complicated. A plurality of operation switches is arranged around the console, controller or seat of a vehicle, so that it is difficult for a user to operate the switches. Therefore, a vehicle communication apparatus is demanded which can make the operation and input devices smaller and reduce the number of operation switches by using a simple communication circuit.

SUMMARY OF THE INVENTION

Accordingly, it is an aspect of the present invention to provide a communication circuit capable of securely starting transmission of information to thus perform communication in a short time by a simple configuration while reducing the influence by environmental noise, and a vehicle communication apparatus using the same.

According to an illustrative embodiment of the present invention, there is provided a communication circuit including a transmission unit and a reception unit, the transmission unit being configured to transmit an information bit string to the reception unit. The transmission unit includes: a bit string generation circuit that sequentially outputs a start bit and then outputs the information bit string; a first modulation circuit that modulates a first carrier wave by the start bit output from the bit string generation circuit to generate a first high frequency signal; a second modulation circuit that modulates a second carrier wave by the information bit string output from the bit string generation circuit to generate a second high frequency signal, wherein the first carrier wave has a frequency different from that of the second carrier wave; and a transmission circuit that transmits the first high frequency signal and the second high frequency signal from a transmitting antenna. The reception unit includes: a reception circuit that receives a signal transmitted from the transmission unit by a receiving antenna; a first detector circuit that is connected to the reception circuit and detects a signal of the first carrier wave to demodulate the start bit; a second detector circuit that is connected to the reception circuit and detects a signal of the second carrier wave to demodulate the information bit string; and a detection circuit that is synchronized by the start bit and reads out the information bit string demodulated by the second detector circuit.

According to the above communication circuit, the transmission unit can transmit the start bit and the information bit string by the first and second carrier waves having different frequencies, respectively. The reception unit can extract the start bit that gives a start timing of the reception only by detecting the first carrier wave. Thereby, compared to the related-art communication method in which the carrier wave of one frequency is used to transmit the start bit and the information bit string in a time division manner, it is easy to securely recognize the start bit while reducing an influence by the exogenous noises. In addition, since the two detector circuits are used to separately detect the signals having two different frequencies, it is possible to increase the signal-to-noise ratio, to reduce the false recognition due to the exogenous noises and to clearly distinguish the start bit and the information bit string, thereby appropriately performing the respective processes. Therefore, it is possible to remarkably reduce generation of the reception errors and to decrease the re-reception of data for recovery of the error, thereby completing the communication in a short time. In addition, it is not necessary to provide a special signal or to make the start bit redundant so as to surely recognize the start timing of the reception, so that it is possible to shorten the transmission time. Further, since the transmission method is simple, the complex control is not necessary, and therefore, the communication circuit can be realized by a simple configuration.

In the above communication circuit, the first modulation circuit may generate the first high frequency signal by a logical product of an output of an oscillation circuit that generates the first carrier wave and the start bit that is output from the bit string generation circuit. The second modulation circuit may generate the second high frequency signal by a logical product of an output of an oscillation circuit that generates the second carrier wave and the information bit string that is output from the bit string generation circuit. The transmission circuit may generate a signal to be transmitted from the transmitting antenna by a logical sum of the first high frequency signal and the second high frequency signal.

According to the above configuration, it is possible to configure the transmission unit with the small number of parts and a simple logical circuit.

In the above communication circuit, the transmitting antenna may be provided adjacent to an operation switch, and the transmitting antenna may transmit a signal to a body of a user who operates the operation switch, and the receiving antenna receives the signal transmitted from the transmitting antenna through the body of the user.

According to the above configuration, it is possible to transmit the operation information of the operation switch, which is made by the user, by using the user's body as a transmission path. Thereby, compared to the related-art input device that transmits the operation information by the wires, radio signals, light and the like, it is possible to implement an input device having a further simpler configuration. In addition, since it is possible to suppress the high frequency noise that is emitted when using the radio signals, it is possible to considerably reduce the electromagnetic interference to the surrounding electronic devices.

In the above communication circuit, a plurality of the transmitting antennas may be provided adjacent to a plurality of the operation switches, respectively, and the information bit string may be defined for each of the operation switches. The transmission unit may include a plurality of the second modulation circuits and a plurality of the transmission circuits respectively for the operation switches. The bit string generation circuit may output the start bit to the first modulation circuit and then outputs the information bit string for each of the operation switches to the corresponding second modulation circuit in parallel with each other. Each of the transmission circuits may transmit the first high frequency signal that is generated by the first modulation circuit and a second high frequency signal that is generated by each of the second modulation circuits from the corresponding transmitting antenna.

According to the above configuration, it is possible to transmit the information of the operation switch of the plurality of operation switches, which is operated by the user, from the transmission unit to the reception unit through the user's body. Thereby, it is possible to easily recognize one operation of the plurality of operation switches with a simple configuration. Thus, even when the plurality of operation switches are provided, it is possible to realize an input device that a user can easily operate and to reduce the number of operation switches.

In the above communication circuit, one transmission unit and two or more reception units may be provided According to the above configuration, when an operation switch, which is commonly provided, is operated by a user, it is possible to distinguish a user who has operated the operation switch depending on which reception unit receives the information of the operation switch through the body of the user who has operated the operation switch.

In the above communication circuit, two or more transmission units and one reception unit may be provided.

According to the above configuration, it is possible to distinguish which switch of two or more switches, which are provided at remote positions, has been operated by the user.

According to another illustrative embodiment of the present invention, there is provided a vehicle communication apparatus including the above described communication circuit wherein the information bit string is for controlling an in-vehicle device.

According to the above configuration, it is possible to remarkably reduce the false reception due to the exogenous noises and to decrease the re-reception for recovery of the error, thereby completing the communication of the in-vehicle device in a short time. In addition, it is not necessary to provide a special signal or to make the start bit redundant so as to positively secure the start timing of the reception, so that it is possible to shorten the transmission time. Further, since the transmission method is simple, the complex control is not necessary and the communication apparatus can be realized by a simple configuration.

According to a further illustrative embodiment of the present invention, there is provided a vehicle communication apparatus including the above described communication circuit, wherein the information bit string is for controlling an in-vehicle device, wherein the transmitting antenna is provided adjacent to an operation switch provided around a vehicle seat or provided to a remote controller for the in-vehicle device, and wherein the transmitting antenna transmits a signal to a body of a user who operates the operation switch, and the receiving antenna include a conductor provided in a seat face of the vehicle seat and receives the signal transmitted from the transmitting antenna through the body of the user.

According to the above configuration, it is possible to transmit the information of the operation switch provided around the vehicle seat and the like, which is operated by a passenger sitting on the vehicle seat, through a passenger's body. Thereby, it is possible to easily recognize any one operation of the plurality of operation switches with a simple configuration. Thus, even when the plurality of operation switches is provided, it is possible to realize an input device that a user can easily operate and to reduce the number of operation switches.

In the above vehicle communication apparatus, two or more reception units may be provided, and receiving antennas provided to the respective reception units may be provided to seat faces of different vehicle seats, respectively.

According to the above configuration, it is possible to distinguish that the operation switch commonly provided to the plurality of seats is operated by a passenger sitting on which seat and to perform the different control depending on the passenger who has performed the operation.

BRIEF DESCRIPTION OF THE DRAWINGS

In the followings, non-limited exemplary illustrative embodiments of the present invention will be described. The present invention will be further described with reference to the drawings. In the drawings, the same reference numerals indicate the same parts.

DETAILED DESCRIPTION

The following descriptions are to exemplarily explain the illustrative embodiments of the invention and to effectively understand the principles and conceptual characteristics of the present invention without difficulty. The descriptions are not to specifically explain the structural details of the present invention beyond the fundamental understanding of the present invention, and one skilled in the art can appreciate how several illustrative embodiments of the present invention are actually implemented by referring to the descriptions corresponding to the drawings.

(Communication Circuit)

Figure 1:
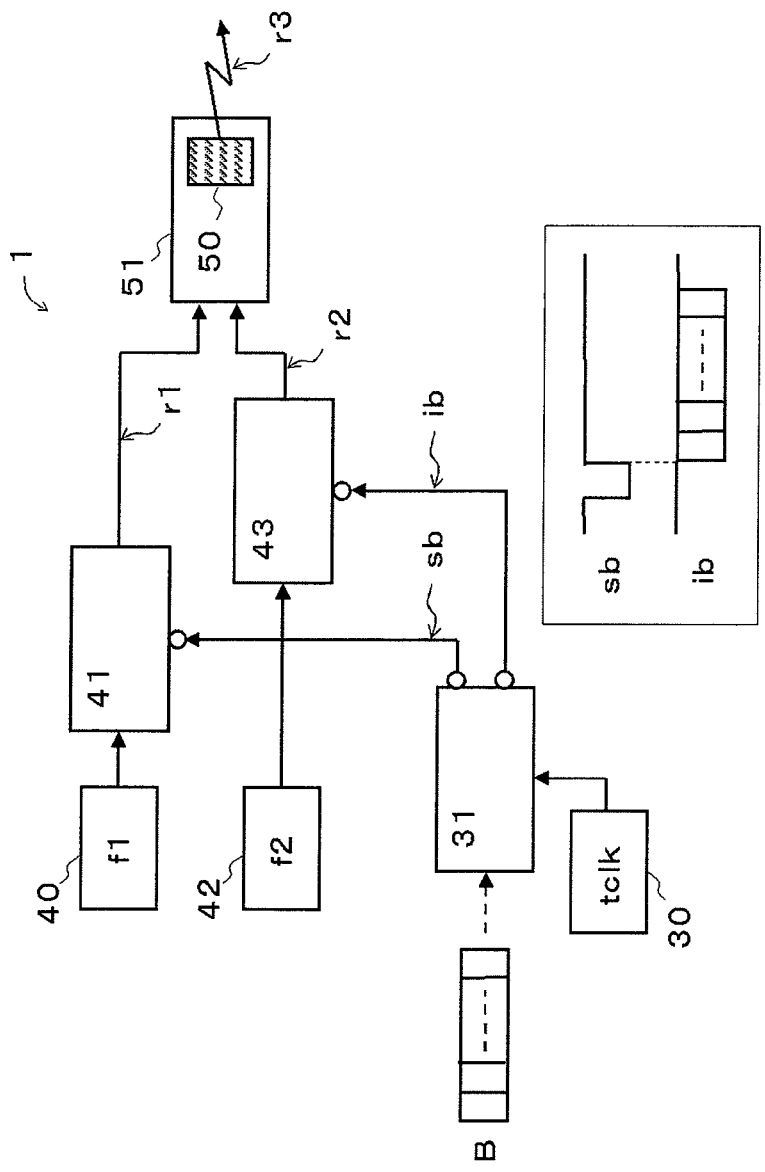
FIG. 1 is a block diagram showing a configuration of a transmission unit of a communication circuit.
Figure 2:
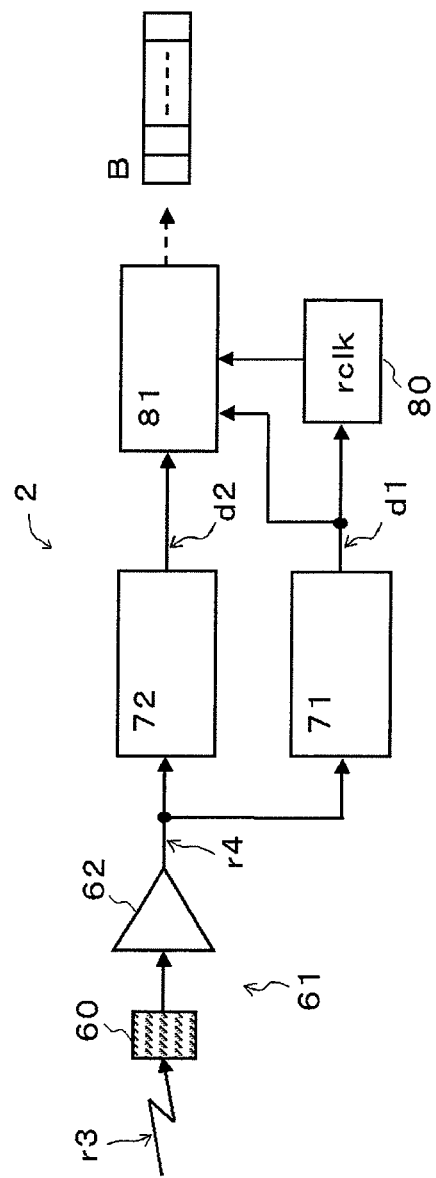
FIG. 2 is a block diagram showing a configuration of a reception unit of a communication circuit.

A communication circuit of the present invention has a transmission unit for serially transmitting information in an asynchronous manner, and a reception unit. The configurations of the transmission unit and the reception unit are shown in FIGS. 1 and 2.

A transmission unit 1 has a bit string generation circuit 31 that sequentially outputs a start bit and an information bit string, a first modulation circuit 41 that modulates a first carrier wave by the start bit sb, which is output from the bit string generation circuit 31, to generate a first high frequency signal, a second modulation circuit 43 that modulates a second carrier wave by the information bit string ib, which is output from the bit string generation circuit 31, to generate a second high frequency signal, and a transmission circuit 51 that transmits the first high frequency signal and the second high frequency signal from a transmitting antenna 50.

A reception unit 2 includes a reception circuit 61 that receives the signal transmitted from the transmission unit 1 by a receiving antenna 60, a first detector circuit 71 that is connected to the reception circuit 61 and detects the signal of the first carrier wave to demodulate the start bit, a second detector circuit 72 that is connected to the reception circuit 61 and detects the signal of the second carrier wave to demodulate the information bit string and a detection circuit 81 that is synchronized by the demodulated start bit and reads out the information bit string demodulated by the second detector circuit.

The information bit string B that is transmitted by the communication circuit may be data having any contents and any length (for example, several bits to several tens of bits). The information bit string B may be generated from the outside and sent to the bit string generation circuit 31 or may be generated in the bit string generation circuit 31 for a specific purpose.

The bit string generation circuit 31 is a circuit that attaches the start bit sb, which is a signal to give a timing of transmission start, to a head of the information bit string ib and sequentially outputs the start bit sb and the information bit string ib. A specific circuit configuration thereof is not particularly limited. The information bit string ib corresponds to the net information bit string B to be transmitted. A width of the start bit sb may be equal to that of each bit configuring the information bit string ib.

A transmission clock signal tclk for outputting a bit string at a constant transmission rate is input to the bit string generation circuit 31 from a transmission clock generation circuit 30. The transmission rate is not particularly limited and may be several tens of bps to several tens of kbps, for example. The bit string generation circuit 31 is configured to output the start bit sb and the information bit string ib based on the transmission clock signal tclk. The start bit sb is output to the first modulation circuit 41 and the information bit string ib is output to the second modulation circuit 43.

The first modulation circuit 41 is a circuit that modulates a first carrier wave by the start bit sb, which is output from the bit string generation circuit 31, to generate a first high frequency signal r1 and a specific circuit configuration thereof is not particularly limited. The first modulation circuit 41 is connected with a first oscillation circuit 40 that generates the first carrier wave. A frequency f1 of the first carrier wave is not particularly limited and may be a constant frequency within a range of several MHz to several tens of MHz, for example. The modulation method is not also particularly limited but an amplitude shift keying (ASK) having a simple configuration may be used. In the below descriptions, it is assumed that the amplitude shift keying is performed by the first modulation circuit 41 and the second modulation circuit 43.

The first modulation circuit 41 may be configured to make the first carrier wave ON (transmission) when the start bit sb is '1' (Low) and to make the first carrier wave OFF (cutoff) when the start bit sb is '0' (High). The first high frequency signal r1 that is generated by the first modulation circuit 41 is output to the transmission circuit 51.

The second modulation circuit 43 is a circuit that modulates a second carrier wave by the information bit string ib, which is output from the bit string generation circuit 31, to generate a second high frequency signal r2 and a specific circuit configuration thereof is not particularly limited. The second modulation circuit 43 is connected with a second oscillation circuit 42 that generates the second carrier wave. A frequency f2 of the second carrier wave is a constant frequency different from the frequency f1 of the first carrier wave and may be a constant frequency within a range of several MHz to several tens of MHz, for example. In the reception unit 2 that will be described below, since the first carrier wave and the second carrier wave are separately detected, it is preferable that the frequency f1 of the first carrier wave and the frequency f2 of the second carrier wave are distant as far as possible. For example, the frequency f1 of the first carrier wave may be 4 MHz and the frequency f2 of the second carrier wave may be 5 MHz.

The second modulation circuit 43 may be configured to make the second carrier wave ON (transmission) when the information bit string ib is '1' (Low) and to make the second carrier wave OFF (cutoff) when the information bit string ib is '0' (High). The second high frequency signal r2 that is generated by the second modulation circuit 43 is output to the transmission circuit 51.

The transmission circuit 51 is a circuit that transmits the first high frequency signal r1, which is generated by the first modulation circuit 41, and the second high frequency signal r2, which is generated by the second modulation circuit 43, from the transmitting antenna 50. As described above, a period during which the first high frequency signal r1 corresponding to the start bit sb is output and a period during which the second high frequency signal r2 corresponding to the information bit string ib is output may not overlap with each other. Accordingly, the transmission circuit 51 may be configured to transmit a signal r3 when any one of the first high frequency signal r1 and the second high frequency signal r2 is output. The transmission signal r3 may be amplified by an amplifier, as required, depending on transmission paths to be used, and then transmitted from the transmitting antenna 50.

The reception unit 2 has, as shown in FIG. 2, the reception circuit 61 that receives the signal r3 transmitted from the transmission unit 1, the first detector circuit 71 that demodulates the start bit, the second detector circuit 72 that demodulates the information bit string and the detection circuit 81 that is synchronized by the start bit and detects the information bit string. The reception circuit 51, the first detector circuit 71 and the second detector circuit 72 may be appropriately provided with filter circuits depending on the frequencies of the carrier waves.

The reception circuit 61 has the receiving antenna 60 and an amplifier 62 and receives the transmission signal r3, which is transmitted from the transmission unit 1, to generate a reception signal r4. The reception signal r4 is output to the first detector circuit 71 and the second detector circuit 72.

The first detector circuit 71 is a circuit that is connected to the reception circuit 61 and detects the signal of the first carrier wave having the frequency f1 from the reception signal r4, thereby demodulating the start bit sb. A specific circuit thereof is not particularly limited and may be configured by an envelope detector circuit, a filter circuit and the like, for example. A first detected signal d1 that is generated by the first detector circuit 71 is output to the detection circuit 81 and the like.

The second detector circuit 72 is a circuit that is connected to the reception circuit 61 and detects the signal of the second carrier wave having the frequency f2 from the reception signal r4, thereby demodulating the information bit string ib. A specific circuit thereof is not particularly limited and may be configured by an envelope detector circuit, a filter circuit and the like, for example. A second detected signal d2 that is generated by the second detector circuit 72 is output to the detection circuit 81 and the like.

The detection circuit 81 is a circuit that is synchronized by the first detected signal d1, which is generated by the first detector circuit 71, i.e., the demodulated start bit sb and samples the second detected signal d2, which is generated by the second detector circuit 72, i.e., the demodulated information bit string ib on the basis of a reception clock signal rclk, thereby reading out the original information bit string. The reception clock signal rclk for giving a timing of the sampling is input to the detection signal 81 from a reception clock generation circuit 80. The reception clock signal rclk has the same rate as the transmission clock signal tclk. However, in order to generate a timing of a specific sampling, a signal of a higher rate (for example 16 times and 64 times than the above rate, and the like) may be used.

The first detected signal d1 that is generated by the first detector circuit 71 is a signal obtained by demodulating the start bit sb and the detection circuit 81 is initialized by the start bit sb. In addition, it may be possible that the first detected signal d1 is output to the reception clock generation circuit 80 to match a phase of the reception clock signal rclk at the timing of the start bit sb.

After the detection circuit 81 is initialized, the second detected signal d2 is output to the detection circuit from the second detector circuit 72. The detection circuit 81 is configured to sequentially read out the second detected signal d2 at the detection timing that is generated based on the reception clock signal rclk. Thereby, the reception unit 2 can recognize the original information bit string B.

Figure 3:
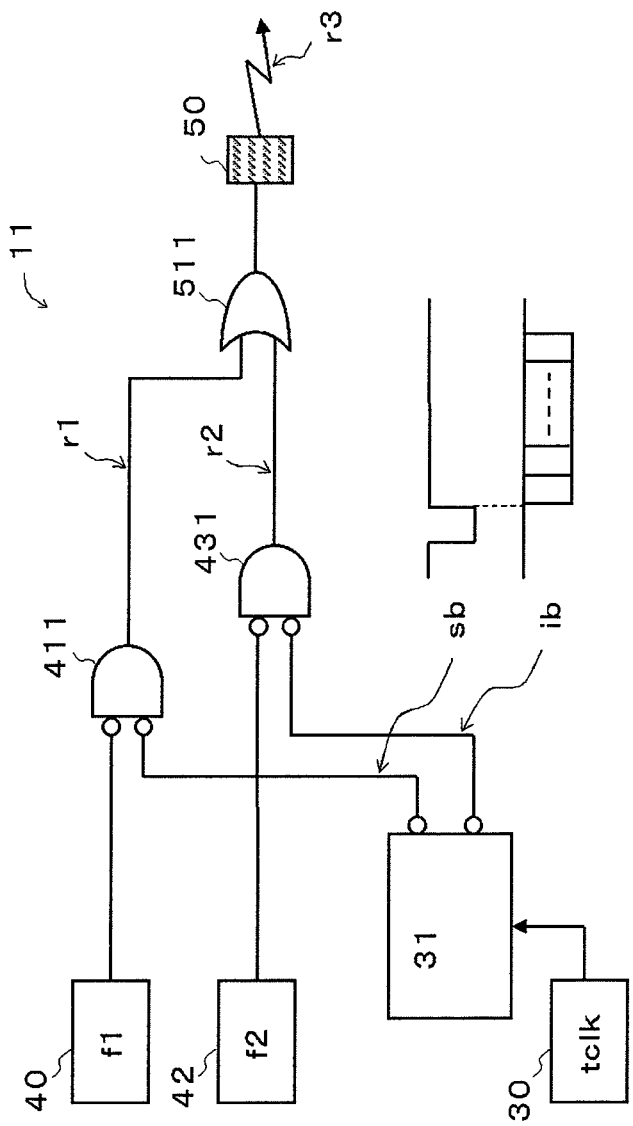
FIG. 3 is a circuit diagram showing an example in which a modulation circuit and a transmission circuit provided to the transmission unit are configured by a logical circuit device.

The first modulation circuit, the second modulation circuit and the transmission circuit, which are provided to the transmission unit, may be configured by a logical circuit as shown in FIG. 3. The first modulation circuit of a transmission unit 11 generates the first high frequency signal r1 by a logical product circuit 411 of an output of the oscillation circuit 40, which generates the first carrier wave, and the start bit sb, which is output from the bit string generation circuit 31. In addition, the second modulation circuit generates the second high frequency signal r2 by a logical product circuit 431 of an output of the oscillation circuit 42, which generates the second carrier wave, and the information bit string ib, which is output from the bit string generation circuit 31. The transmission circuit generates the transmission signal by a logical sum circuit 511 of the first high frequency signal r1 and the second high frequency signal r2. Thereby, when the start bit sb is '1', the first carrier wave becomes ON and when the information bit string ib is '1', the second carrier wave becomes ON, so that it is possible to transmit the start bit and the information bit string from the transmitting antenna 50.

The transmission path between the transmission unit 1, 11 and the reception unit 2 is not particularly limited and may be wired or wireless path. For example, it may be configured such that the transmission signal r3 is a radio signal, and that the transmission unit and the reception unit have antennas and transmission and reception circuits for transmitting and receiving the radio signal, thereby performing the wireless communication.

In addition, the transmission path may be a human body and the information may be transmitted by the so-called human body communication. For example, it is possible to configure an input system that transmits an operating state of an operation unit enabling a user to perform a touch operation with a finger and the like. In this case, the transmitting antenna is provided adjacent to an operation switch and the like that a user's body touches, and the transmission signal is transmitted from the transmitting antenna to the user's body touching the operation switch and the like. The receiving antenna is provided adjacent to the user's body and receives the transmission signal through the user's body.

Figure 4:
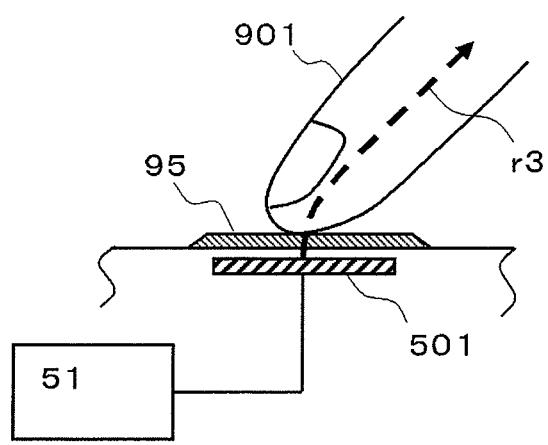
FIG. 4 illustrates an example in which a transmitting antenna is provided adjacent to an operation switch and a signal is transmitted from the transmitting antenna to a body of a user who is operating the operation switch.

FIG. 4 shows an example in which a transmitting antenna 501 is provided adjacent to an operation switch 95 and a signal is transmitted from the transmitting antenna 501 to a user's finger 901 and the like touching the operation switch 95. The transmitting antenna 501 is provided just below the operation switch 95 and is connected to the transmission circuit 51 (511) of the transmission unit. The transmitting antenna 501 can transmit the transmission signal r3 to the user's body 901 touching the operation switch 95. A receiving antenna is provided adjacent to another part of the user's body, so that it is possible to receive the transmission signal transmitted from the transmitting antenna 501 through the user's body.

Figure 5:
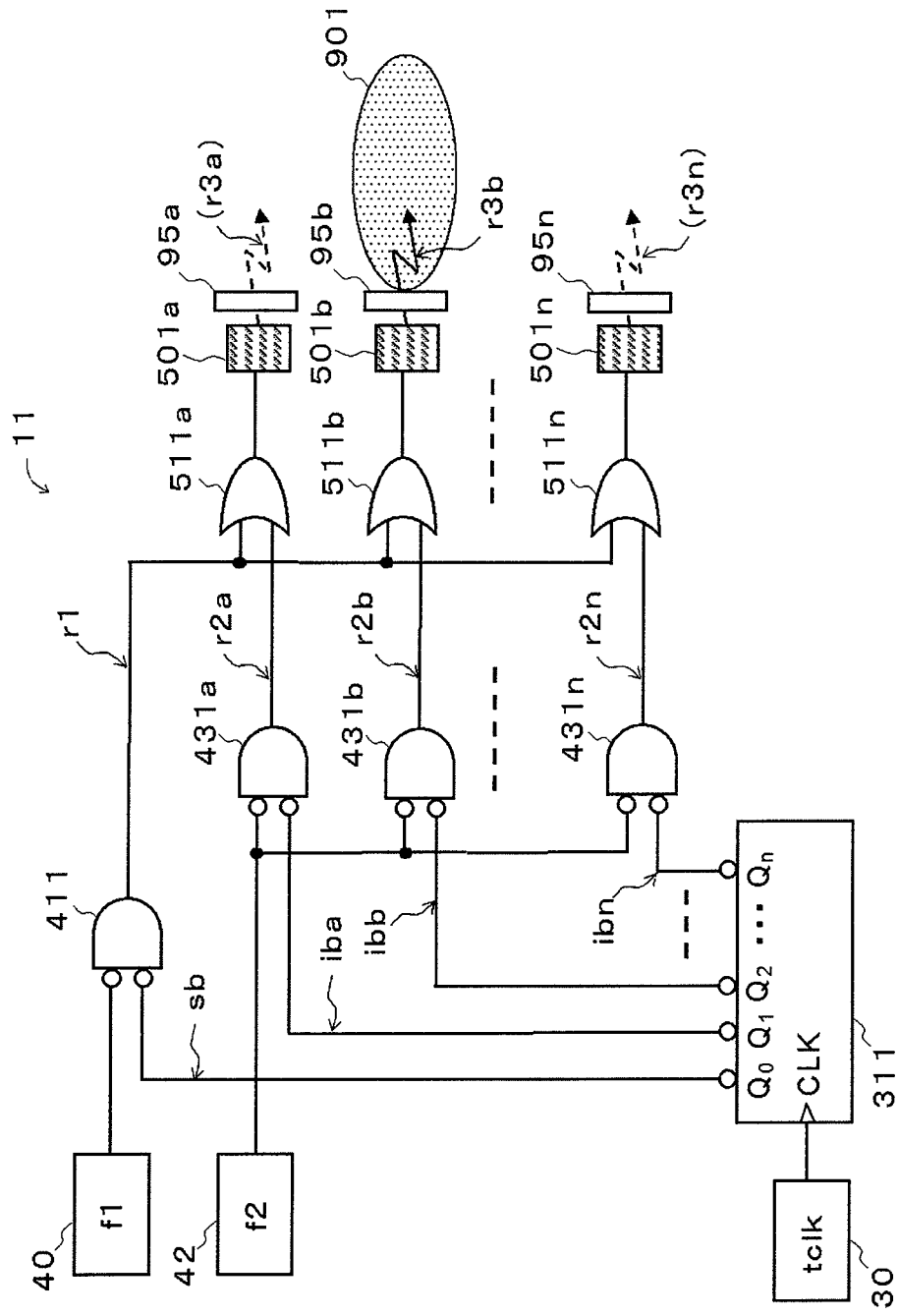
FIG. 5 is a circuit diagram showing a configuration example of a transmission unit that has a plurality of operation switches and second modulation circuits and transmission circuits for the respective operation switches and transmits information bit strings corresponding to the respective operation switches.

For a configuration in which a plurality of operation switches are provided to an operation panel and the like, when a user operates one of the operation switches, it is possible to transmit the information by the above communication circuit. For the respective operation switches, unique codes (information bit strings) are respectively defined in advance. When the user touches an operation switch, the information corresponding to the operation switch is transmitted and it is thus possible to recognize which operation switch is operated. For example, the communication circuit may be configured by the transmission unit 11 shown in FIG. 5 and a reception unit 21 shown in FIG. 6.

The transmission unit 11 has transmitting antennas 501a to 501n that are provided adjacent to respective operation switches 95a to 95n, transmission circuits 511a to 511n corresponding to the respective operation switches 95a to 95n and second modulation circuits 431a to 431n corresponding to the respective operation switches 95a to 95n. The first modulation circuit 411 is configured similarly to that described above.

A bit string generation circuit 311 that is provided to the transmission unit 11 is configured to generate the start bit sb and information bit strings iba to ibn unique to the respective operation switches 95a to 95n. The bit string generation circuit 311 may be configured by a counter, a shift register and the like, for example. From the bits string generation circuit 311, the start bit sb is first output to the first modulation circuit 411 and then the information bit strings iba to ibn corresponding to the respective operation switches 95a to 95n are sequentially output in parallel to the second modulation circuits 431a to 431n corresponding to the respective operation switches 95a to 95n, based on the output tclk of the transmission clock generation circuit 30. The respective second modulation circuits 431a to 431n generate second high frequency signals r2a to r2n corresponding to the respective operation switches 95a to 95n and output the same to the corresponding transmission circuits 511a to 511n. The respective transmission circuits 511a to 511n corresponding to the respective operation switches 95a to 95n transmit the first high frequency signal r1, which is generated by the first modulation circuit 411, and the respective second high frequency signals r2a to r2n, which are generated by the respective second modulation circuits 431a to 431n, from the respective transmitting antennas 501a to 501n. Thus, when the user operates the operation switch 95b with the finger 901 and the like, for example, the transmission signal r3b corresponding to the information bit string ibb unique to the operation switch 95b is transmitted to the user's body.

Figure 6:
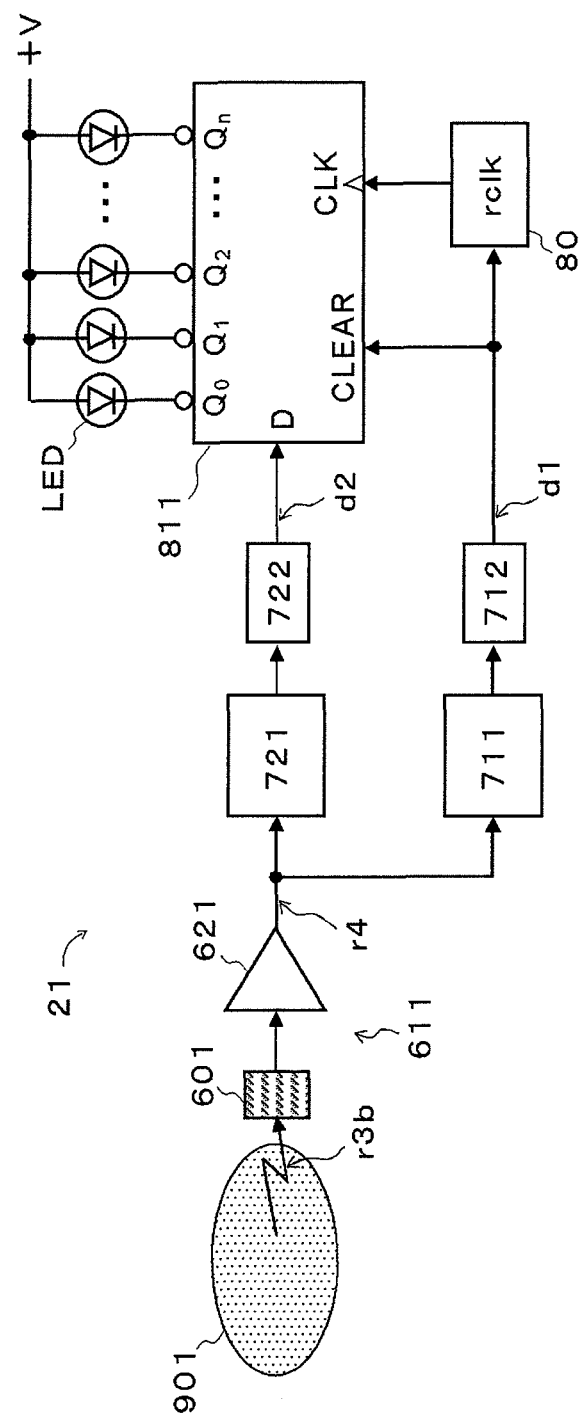
FIG. 6 is a circuit diagram showing a configuration example of a reception unit that receives the information bit string corresponding to the operation switch transmitted from the transmission unit shown in FIG. 5.

The transmission signal (for example, r3b) that is transmitted from the transmission unit 11 is received by the reception unit 21 shown in FIG. 6. The reception unit 21 has a reception circuit 611, a first detector circuit 711 and a second detector circuit 712, which are connected to the reception circuit 611, and a detection circuit 811.

The reception circuit 611 has a receiving antenna 601 and an amplifier 621. The receiving antenna 601 may be configured by a conductor that is provided adjacent to a user's body. A high frequency signal r4 that is output from the amplifier 621 is input to the first detector circuit 711 and the second detector circuit 721.

The first detector circuit 711 detects a first carrier wave having a frequency f1 modulated by the start bit sb, thereby generating a first detected signal d1 obtained by demodulating the start bit. The second detector circuit 721 detects a second carrier wave having a frequency f2 modulated by the information bit string ib, thereby generating a second detected signal d2 obtained by demodulating the information bit string. Filter circuits 712, 722 corresponding to the frequencies f1, f2 may be appropriately added before and/or after the first detector circuit 711 and the second detector circuit 721.

The detection circuit 811 is a circuit for recognizing the transmitted information bit string, i.e., the information bit string unique to the operated operation switch and may be configured by a latch circuit, a decoder circuit and the like. Therefore, the detection circuit 811 is connected with the reception clock generation circuit 80 that generates a clock signal having the same or 16 times, 64 times and the like as or than the transmission clock signal tclk. By the first detected signal d1 that is generated by the first detector circuit 711, i.e., the demodulated signal of the start bit sb, the detection circuit 811 is initialized and a phase of the reception clock signal that is generated in the reception clock generation circuit 80 is matched to the timing of the start bit sb. Thereby, the detection circuit 811 can detect a value of the second detected signal d2, which is output from the second detector circuit 721, at a detection timing that is generated based on the reception clock signal. In addition, the detection signal 811 can decode the detected bit string to recognize the operated operation switch.

For example, as shown in FIG. 6, when LEDs are connected to outputs of the detection circuit 811, an LED corresponding to the operated operation switch is turned on in response to the decoded result. An output signal of the detection circuit 811 may be output to any external apparatus and the external apparatus can be operated based on the operation of the operation switch.

Figure 7:
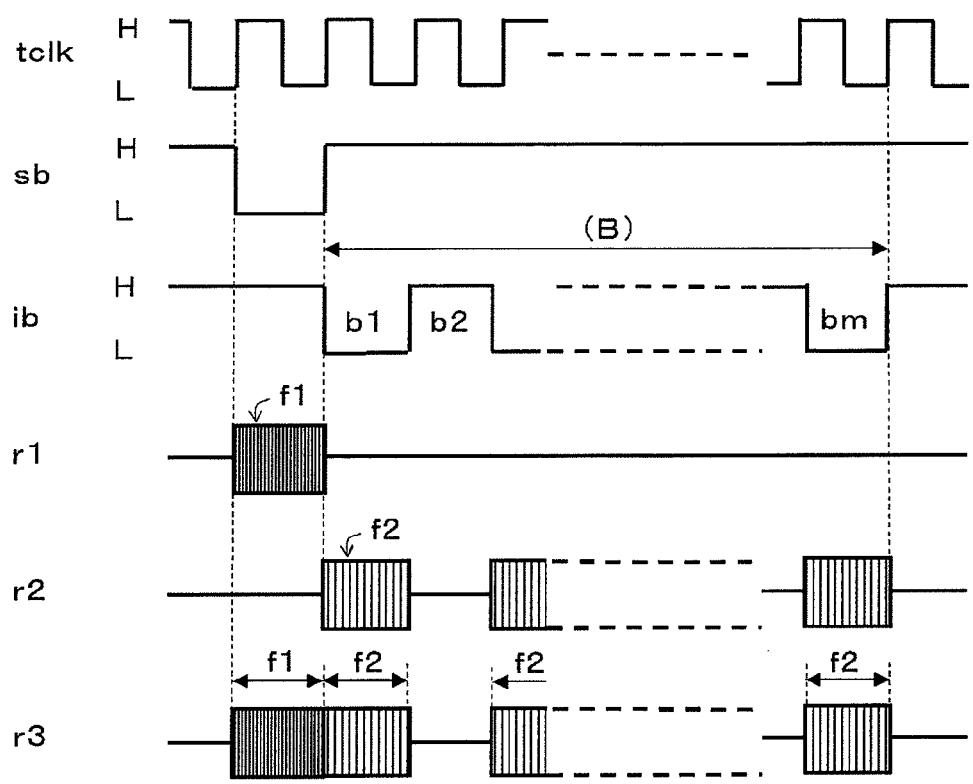
FIG. 7 is a timing chart showing an operation of a transmission unit.

The operations of the transmission unit 1 and the reception unit 2 are described with reference to FIGS. 7 and 8. FIG. 7 is a timing chart showing the operation of the transmission unit 1. The start bit sb and the information bit string ib are transmitted based on the transmission clock signal tclk.

When the information bit string B having a length of m bits to be transmitted is provided, the start bit sb of one bit is output by the bit string generation circuit 31. From the bit string generation circuit 31, the information bit string ib corresponding to the information bit string B is sequentially output after the transmission of the start bit sb. The information bit string ib has respective bits of bit b1, bit b2, ..., bit m.

By the start bit sb that is output from the bit string generation circuit 31 to the first modulation circuit 41, the first carrier wave having the frequency f1 is demodulated and the first high frequency signal r1 is thus generated. The first high frequency signal r1 is configured such that the first carrier wave is ON (transmission) when the start bit sb is 1 (L) and the first carrier wave is OFF (cutoff) when the start bit sb is 0 (H).

By the information bit string ib (b1, b2, ..., bm) that is output from the bit string generation circuit 31 to the second modulation circuit 43, the second carrier wave having the frequency f2 is demodulated and the second high frequency signal r2 is thus generated. The second high frequency signal r2 is configured such that the second carrier wave is ON (transmission) when each bit of the information bit string ib is 1 (L) and the second carrier wave is OFF (cutoff) when each bit of the information bit string ib is 0 (H).

The first high frequency signal r1 and the second high frequency signal r2 are transmitted from the transmission circuit 51 while being combined as the transmission signal r3. The transmission signal r3 is configured to have the frequency f1 when the start bit is 1 and the frequency f2 when each bit configuring the information bit string ib is 1.

Figure 8:
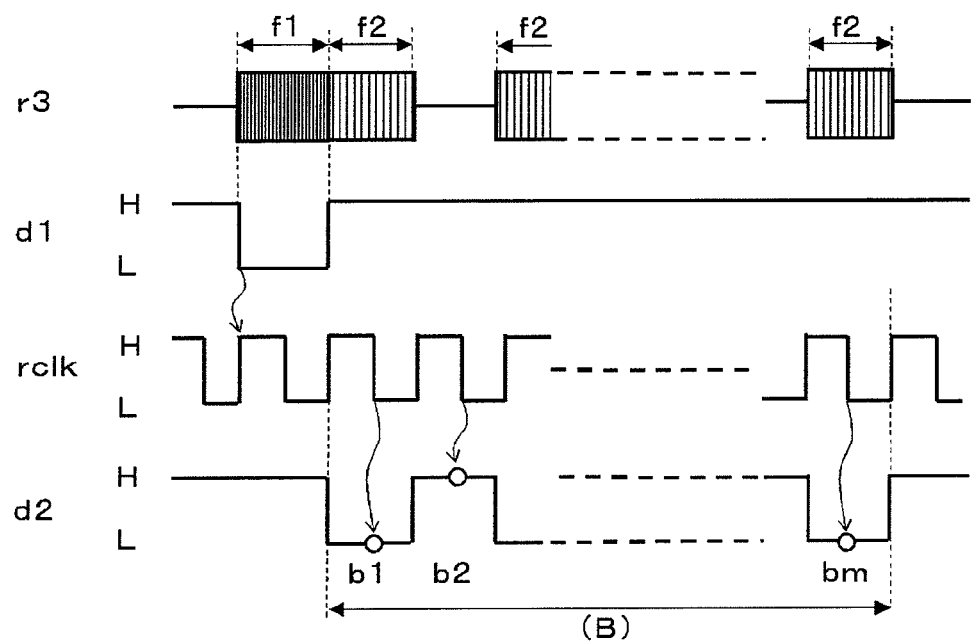
FIG. 8 is a timing chart showing an operation of a reception unit.

FIG. 8 is a timing chart showing the operation of the reception unit 2. The transmission signal r3 that is transmitted from the transmission unit 1 is received and then amplified by the reception circuit 61. The first carrier wave having the frequency f1, which is included in the amplified reception signal, is detected by the first detector circuit 71, so that the first detected signal d1, i.e., demodulated start bit signal is obtained. By the demodulated start bit signal, the detection signal 81 is initialized and the phase of the reception clock signal rclk that drives the detection signal 81 can be matched with the start bit.

In the meantime, the second carrier wave having the frequency f2, which is included in the reception signal amplified by the reception circuit 61, is detected by the second detector circuit 72, so that the second detected signal d2, i.e., demodulated information bit string signal is obtained. The second detected signal d2 is transmitted to the detection signal 81. The detection circuit 81 reads out a level of the second detected signal d2 at a detection timing based on the reception clock signal rclk. Thereby, it is possible to recognize the transmitted information bit string ib (B).

Figure 9:
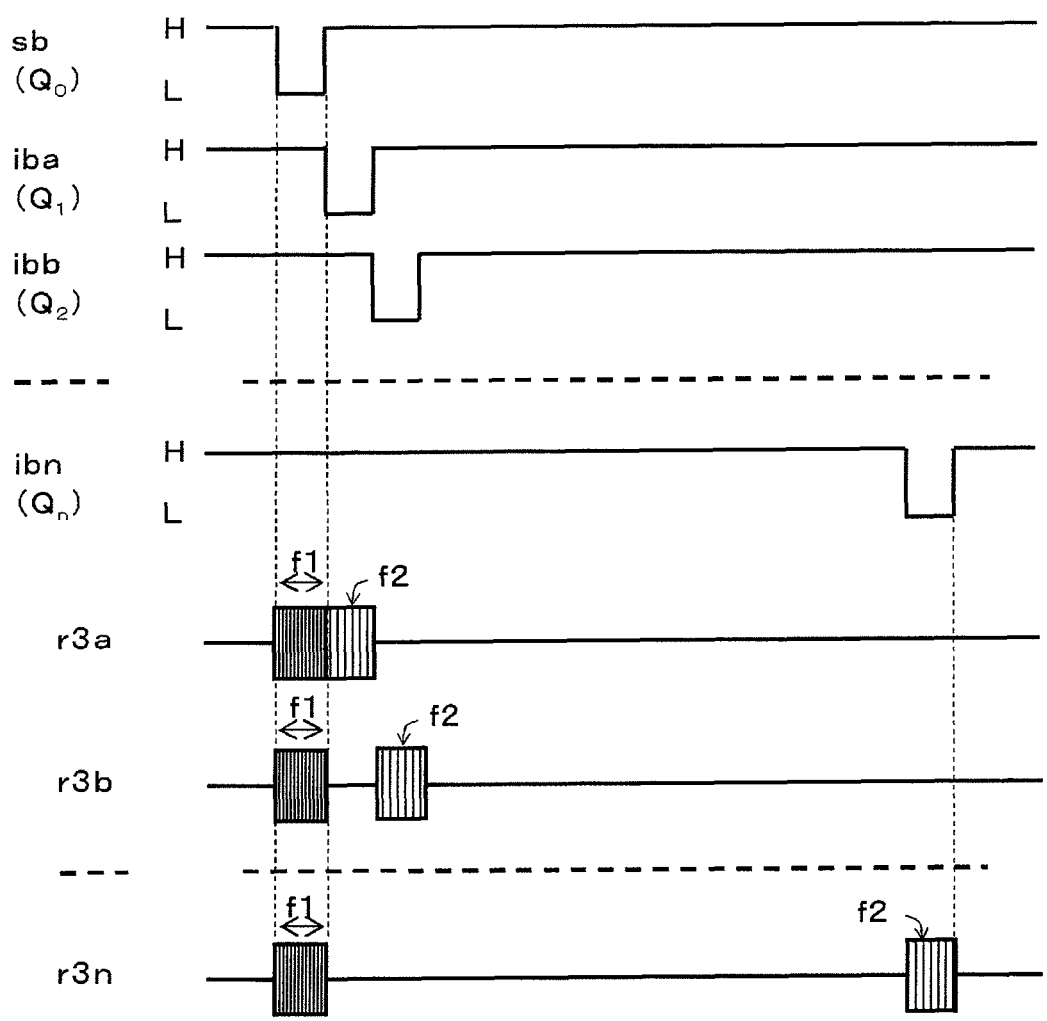
FIG. 9 is a timing chart showing an operation of the transmission unit shown in FIG. 5.

FIG. 9 is a timing chart showing the operations of the transmission unit 11 and the reception unit 21 (refer to FIGS. 6 and 7). For example, the bit string generation circuit 311 may be a counter circuit that outputs pulse signals, which become alternately ON (L) every one period of the transmission clock signal tclk, from terminals Q0 to Qn. Thus, a pulse signal of the terminal Q0, which is first output, is used as the start bit sb. In addition, the respective pulse signals, which are output from the terminals Q1, Q2, ..., Qn, are used as the information bit strings iba, ibb, ..., ibn of n bits corresponding to n operation switches 95a, 95b, ..., 95n. By doing so, the first carrier waves (having the frequency f1) are transmitted from all transmitting antennas corresponding to the respective operation switches when the start bit sb is ON. Subsequently, the second carrier waves (having the frequency f2), which are modulated by the information bit strings corresponding to the respective operation switches, are transmitted from transmitting antennas 501a, 501b, ..., 502n. Thereby, the transmission signals from the respective transmitting antennas become r3a, r3b, ..., r3n. When a user touches any one operation switch, the transmission signal (for example, r3b) corresponding to the operation switch is transmitted to the user's body.

The reception unit 21 receives and demodulates the transmission signal through the user's body, as described above, and decodes the demodulated information bit string, thereby recognize the operation switch touched with the user's body.

Furthermore, the communication circuit may be configured by one transmission unit and two or more reception units. For example, the one transmission unit 11 and the two reception units 21 provided at separate positions may be provided. Thereby, it is possible to distinguish the user who has operated the operation switch or a position thereof depending on which reception unit 21 receives the transmission signal from the transmission unit 11 that is provided in correspondence to the operation switch.

In addition, the communication circuit may be configured by two or more transmission units and one reception unit. For example, the transmission units 11 may be provided in correspondence to each of the different operation units and the one reception unit 21 receives the transmission signal that is transmitted from any one transmission unit 11. Thereby, it is possible to distinguish which of the operation units is operated.

(Vehicle Communication Apparatus)

The above communication circuit can be appropriately used for a vehicle communication apparatus for controlling an in-vehicle device. The communication circuit having the transmission unit 1 or 11 and the reception unit 2 or 21 may be used for a vehicle communication apparatus that transmits an information bit string for controlling an in-vehicle device. For example, it is possible to configure a vehicle communication apparatus having simple configuration and control by connecting operation units (console, remote controller and the like) and a variety of in-vehicle devices (interior light, electrically-driven seat, electrically-driven window, audio device, air conditioner, heater and the like) to the communication circuit. The transmission may be made by wires, radio waves, lights, human body and the like. Even when the radio waves are used, it is possible to reduce the exogenous noise, thereby performing the communication in a short time.

In addition, by using the communication circuit that is configured to perform the communication through a human body, it is possible to implement a vehicle communication apparatus that transmits an information bit string for controlling an in-vehicle device. The transmitting antenna is provided around a vehicle seat or adjacent to an operation switch provided to a remote controller. The operation switch may be provided at a position (for example, console panel, seat, arm rest, ceiling, remote controller and the like) at which a passenger sitting on the vehicle seat can operate the operation switch. In addition, the receiving antenna is provided at a part close to a passenger's body, such as seat face of the vehicle seat.

Figure 10:
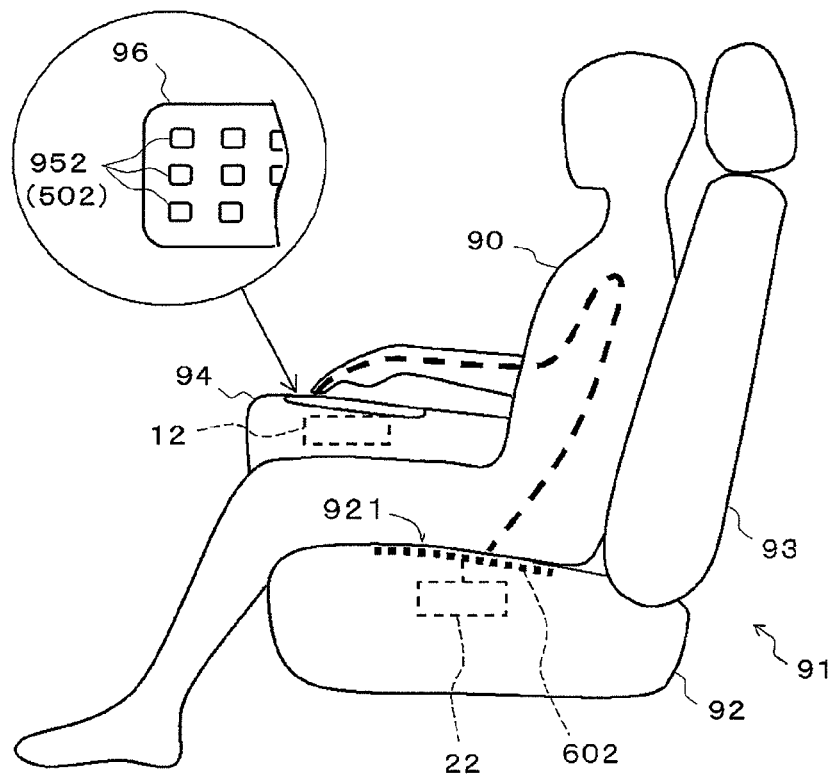
FIG. 10 is a schematic view of a vehicle communication apparatus in which transmitting antennas are provided adjacent to operation switches provided around a vehicle seat and a receiving antenna is provided to a seat face of the vehicle seat.

FIG. 10 shows an example in which a passenger 90 operates an operation unit 96 that is provided to a side of a vehicle seat 91. The operation unit 96 is provided with a plurality of operation switches 952 and transmitting antennas 502 are respectively provided adjacent to each of the operation switches. The respective transmitting antennas 502 are driven by the transmission unit 12. In addition, a seat face 921 is provided with a receiving antenna 602 and has a reception unit 22 that processes a received signal.

The receiving antenna 602 may be configured by a conductor that is provided on a surface of the seat face 921 or just below the surface. As the conductor, a conductive fabric and the like may be used in addition to metal. The shape, size, structure and the like of the receiving antenna 602 are not particularly limited insofar as the antenna can receive a signal, which is transmitted from the transmission unit 12, through the passenger's body 90 sitting on the seat. For example, the receiving antenna may be configured by making the surface material of the seat face 921 of the seat with a conductive fabric having braided metal fibers.

From the respective transmission antennas 502, the codes (information bit strings) corresponding to the respective operation switches are modulated and transmitted by the transmission unit 12. When the passenger 90 operates one of the operation switches of the operation unit 96, a signal corresponding to the operation switch is transmitted to the body of the passenger 90. The signal, which is transmitted to the body, is received by the receiving antenna 602 provided to the seat surface of the seat. The reception signal is demodulated and decoded by the reception unit 22, so that it is possible to detect which of the operation switches is operated.

A signal of the detection result is output from the reception unit 22 to the various in-vehicle devices (for example, interior light, electrically-driven seat, electrically-driven window, audio device, air conditioner, heater and the like), thereby enabling the in-vehicle device to perform the operation corresponding to the operation of the passenger.

Figure 11:
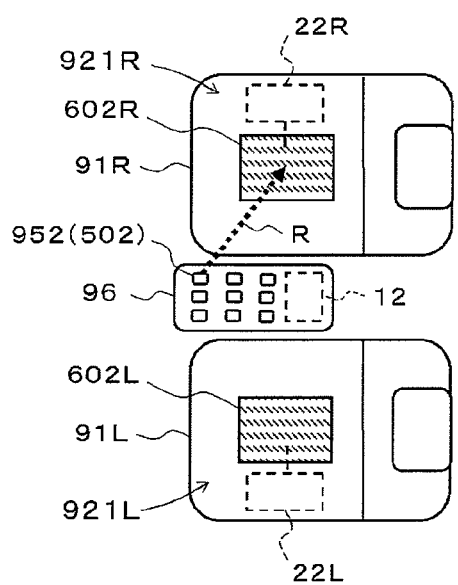
FIG. 11 is a plan view of a vehicle communication apparatus in which a transmission unit is provided to an operation unit provided between two arranged vehicle seats and receiving antennas and reception units are provided to seat faces of the vehicle seats, respectively.

Furthermore, the communication circuit may be used for a vehicle communication apparatus that has two or more reception units and receiving antennas provided to the respective reception units are respectively provided to different seat faces of the vehicle seats. FIG. 11 is a plan view of two vehicle seats 91R, 91L arranged at left and right sides and the operation unit 96 on a console provided between the vehicle seats. Similarly to the above configuration, the operation unit 95 is provided with a plurality of operation switches 952, and the transmitting antennas 502 are respectively provided for each of the operation switches. The respective transmitting antennas 502 are driven by the transmission unit 12. In addition, seat faces 921R, 921L of the two vehicle seats are respectively provided with receiving antennas 602R, 602L and have reception units 22R, 22L that process received signals, respectively.

The configurations and operations of the transmission unit 12 and the respective reception units 22R, 22L are the same as those described above. According to this configuration, it is possible to distinguish whether a passenger (not shown) sitting on any vehicle seat has operated the operation switches 952. For example, when a passenger sitting on the vehicle seat 91R operates the operation switch 952 of the operation unit 96, a signal corresponding to the operation switch is transmitted from the transmitting antenna 502 provided to the operation switch to the passenger's body and is received by the receiving antenna 602R that is provided to the seat face 921R on which the passenger sits. Accordingly, it is possible to distinguish the operations that are performed by the passengers sitting on the different vehicle seats just by providing one common operation switch. Thereby, it is not necessary to provide operation switches for distinguishing left and right seats or separate operation switches for left and right sides, so that it is possible to reduce the number of operation switches and to enable a user to easily operate the switch.

While the present invention has been shown and described with reference to certain illustrative embodiments thereof, it will be understood by those skilled in the art that various changes in form and details may be made therein without departing from the spirit and scope of the invention as defined by the appended claims.

What is claimed is:

1. A communication circuit comprising a transmission unit and a reception unit, the transmission unit being configured to transmit an information bit string to the reception unit,
wherein the transmission unit includes:
a bit string generation circuit that sequentially outputs a start bit and then outputs the information bit string;
a first modulation circuit that modulates a first carrier wave by the start bit output from the bit string generation circuit to generate a first high frequency signal;
a second modulation circuit that modulates a second carrier wave by the information bit string output from the bit string generation circuit to generate a second high frequency signal, wherein the first carrier wave has a frequency different from that of the second carrier wave; and
a transmission circuit that transmits the first high frequency signal and the second high frequency signal from a transmitting antenna, and
wherein the reception unit includes:
a reception circuit that receives a signal transmitted from the transmission unit by a receiving antenna;
a first detector circuit that is connected to the reception circuit and detects a signal of the first carrier wave to demodulate the start bit;
a second detector circuit that is connected to the reception circuit and detects a signal of the second carrier wave to demodulate the information bit string; and
a detection circuit that is synchronized by the start bit and reads out the information bit string demodulated by the second detector circuit.

2. The communication circuit according to claim 1,
wherein the first modulation circuit generates the first high frequency signal by a logical product of an output of an oscillation circuit that generates the first carrier wave and the start bit that is output from the bit string generation circuit,
wherein the second modulation circuit generates the second high frequency signal by a logical product of an output of an oscillation circuit that generates the second carrier wave and the information bit string that is output from the bit string generation circuit, and
wherein the transmission circuit generates a signal to be transmitted from the transmitting antenna by a logical sum of the first high frequency signal and the second high frequency signal.

3. The communication circuit according to claim 1,
wherein the transmitting antenna is provided adjacent to an operation switch,
wherein the transmitting antenna transmits a signal to a body of a user who operates the operation switch, and the receiving antenna receives the signal transmitted from the transmitting antenna through the body of the user.

4. The communication circuit according to claim 3,
wherein a plurality of transmitting antennas are provided adjacent to a plurality of operation switches, respectively, and the information bit string is defined for each of the operation switches,
wherein the transmission unit includes a plurality of second modulation circuits and a plurality of transmission circuits respectively for the operation switches,
wherein the bit string generation circuit outputs the start bit to the first modulation circuit and then outputs the information bit string for each of the operation switches to the corresponding second modulation circuit in parallel with each other, and wherein each of the transmission circuits transmits the first high frequency signal that is generated by the first modulation circuit and a second high frequency signal that is generated by each of the second modulation circuits from the corresponding transmitting antenna.

5. The communication circuit according to claim 3, wherein one transmission unit and two or more reception units are provided in the communication circuit.

6. The communication circuit according to claim 3, wherein two or more transmission units and one reception unit are provided in the communication circuit.

7. A vehicle communication apparatus comprising:
a communication circuit including a transmission unit and a reception unit, the transmission unit being configured to transmit an information bit string for controlling an in-vehicle device to the reception unit,
wherein the transmission unit includes:
a bit string generation circuit that sequentially outputs a start bit and then outputs the information bit string;
a first modulation circuit that modulates a first carrier wave by the start bit output from the bit string generation circuit to generate a first high frequency signal;
a second modulation circuit that modulates a second carrier wave by the information bit string output from the bit string generation circuit to generate a second high frequency signal, wherein the first carrier wave has a frequency different from that of the second carrier wave; and
a transmission circuit that transmits the first high frequency signal and the second high frequency signal from a transmitting antenna, and
wherein the reception unit includes:
a reception circuit that receives a signal transmitted from the transmission unit by a receiving antenna;
a first detector circuit that is connected to the reception circuit and detects a signal of the first carrier wave to demodulate the start bit;
a second detector circuit that is connected to the reception circuit and detects a signal of the second carrier wave to demodulate the information bit string; and
a detection circuit that is synchronized by the start bit and reads out the information bit string demodulated by the second detector circuit.

8. The vehicle communication apparatus according to claim 7,
wherein the first modulation circuit generates the first high frequency signal by a logical product of an output of an oscillation circuit that generates the first carrier wave and the start bit that is output from the bit string generation circuit,
wherein the second modulation circuit generates the second high frequency signal by a logical product of an output of an oscillation circuit that generates the second carrier wave and the information bit string that is output from the bit string generation circuit, and
wherein the transmission circuit generates a signal to be transmitted from the transmitting antenna by a logical sum of the first high frequency signal and the second high frequency signal.

9. A vehicle communication apparatus comprising:
a communication circuit including a transmission unit and a reception unit, the transmission unit being configured to transmit an information bit string for controlling an in-vehicle device to the reception unit,
wherein the transmission unit includes:
a bit string generation circuit that sequentially outputs a start bit and then outputs the information bit string;
a first modulation circuit that modulates a first carrier wave by the start bit output from the bit string generation circuit to generate a first high frequency signal;
a second modulation circuit that modulates a second carrier wave by the information bit string output from the bit string generation circuit to generate a second high frequency signal, wherein the first carrier wave has a frequency different from that of the second carrier wave; and
a transmission circuit that transmits the first high frequency signal and the second high frequency signal from a transmitting antenna, and
wherein the reception unit includes:
a reception circuit that receives a signal transmitted from the transmission unit by a receiving antenna;
a first detector circuit that is connected to the reception circuit and detects a signal of the first carrier wave to demodulate the start bit;
a second detector circuit that is connected to the reception circuit and detects a signal of the second carrier wave to demodulate the information bit string; and
a detection circuit that is synchronized by the start bit and reads out the information bit string demodulated by the second detector circuit,
wherein the transmitting antenna is provided adjacent to an operation switch provided around a vehicle seat or provided to a remote controller for the in-vehicle device, and
wherein the transmitting antenna transmits a signal to a body of a user who operates the operation switch, and the receiving antenna include a conductor provided in a seat face of the vehicle seat and receives the signal transmitted from the transmitting antenna through the body of the user.

10. The vehicle communication apparatus according to claim 9,
wherein a plurality of transmitting antennas are provided adjacent to a plurality of operation switches, respectively, and the information bit string is defined for each of the operation switches,
wherein the transmission unit includes a plurality of second modulation circuits and a plurality of transmission circuits respectively for the operation switches,
wherein the bit string generation circuit outputs the start bit to the first modulation circuit and then outputs the information bit string for each of the operation switches to the corresponding second modulation circuit in parallel with each other, and
wherein each of the transmission circuits transmits the first high frequency signal that is generated by the first modulation circuit and a second high frequency signal that is generated by each of the second modulation circuits from the corresponding transmitting antenna.

11. The vehicle communication apparatus according to claim 9,
wherein one transmission unit and two or more reception units are provided in the communication circuit.

12. The vehicle communication apparatus according to claim 9,
wherein two or more transmission units and one reception unit are provided in the communication circuit.

13. The vehicle communication apparatus according to claim 9,
   wherein two or more reception units are provided, and receiving antennas provided to respective reception units are provided to seat faces of different vehicle seats, respectively.

* * * * *